(12) United States Patent
Kawakatsu et al.

(10) Patent No.: US 9,499,124 B2
(45) Date of Patent: Nov. 22, 2016

(54) OFF-ROAD VEHICLE

(71) Applicant: KAWASAKI JUKOGYO KABUSHIKI KAISHA, Hyogo (JP)

(72) Inventors: Hitoshi Kawakatsu, Kakogawa (JP); Yoshinori Tsumiyama, Miki (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 49 days.

(21) Appl. No.: 14/487,479

(22) Filed: Sep. 16, 2014

(65) Prior Publication Data
US 2016/0075305 A1    Mar. 17, 2016

(51) Int. Cl.
*B60R 22/48* (2006.01)
*B60K 31/02* (2006.01)
*B60K 28/10* (2006.01)

(52) U.S. Cl.
CPC ............. *B60R 22/48* (2013.01); *B60K 28/10* (2013.01); *B60K 31/02* (2013.01); *B60R 2022/4808* (2013.01); *B60R 2022/4816* (2013.01)

(58) Field of Classification Search
CPC .......... B60R 22/48; B60R 2022/4816; B60R 2022/4891; B60K 2031/0091; B60K 31/02; B60K 28/10
USPC ................................ 180/268–270
See application file for complete search history.

(56) References Cited

U.S. PATENT DOCUMENTS

| | | | | |
|---|---|---|---|---|
| 3,815,086 A * | 6/1974 | Minton | ................ | B60R 22/48 180/269 |
| 3,860,904 A * | 1/1975 | Andersen | ................ | B60R 22/48 180/269 |
| 3,930,555 A * | 1/1976 | Iijima | ................ | B60R 22/48 180/269 |
| 3,987,864 A * | 10/1976 | Iijima | ................ | B60R 22/48 180/269 |
| 4,319,658 A * | 3/1982 | Collonia | ................ | B60K 26/04 123/339.18 |
| 5,404,128 A * | 4/1995 | Ogino | ................ | B60R 22/48 180/273 |
| 6,260,650 B1 * | 7/2001 | Gustavsson | ................ | B60K 28/04 180/268 |
| 7,686,119 B2 * | 3/2010 | Greene | ................ | B60R 22/48 180/268 |
| 8,393,428 B2 * | 3/2013 | Onishi | ................ | B60N 2/24 180/54.1 |
| 8,397,843 B2 * | 3/2013 | Tsumiyama | ................ | F02D 41/021 180/290 |
| 8,464,824 B1 | 6/2013 | Reisenberger | | |
| 8,548,710 B1 | 10/2013 | Reisenberger | | |
| 2004/0216942 A1 * | 11/2004 | Tanaka | ................ | B60K 5/04 180/292 |
| 2011/0148146 A1 * | 6/2011 | Takaya | ................ | B60N 2/3011 296/183.1 |

* cited by examiner

Primary Examiner — Ruth Ilan
(74) Attorney, Agent, or Firm — Wenderoth, Lind & Ponack, L.L.P.

(57) ABSTRACT

An off-road vehicle equipped with a driver's seat; a seat belt apparatus provided for the driver's seat; a seat belt detecting device for detecting the set state of the seat belt apparatus provided for the driver's seat; and a controller for controlling the off-road vehicle. The controller has a rotation speed control mode for controlling the rotation speed of the engine to a predetermined rotation speed or less, and the controller releases the rotation speed control mode when the seat belt detecting device detects the set state of the seat belt apparatus provided for the driver's seat.

9 Claims, 4 Drawing Sheets

OFF-ROAD VEHICLE

BACKGROUND OF THE INVENTION

1. Field of the Invention

The present invention relates to an off-road vehicle.

2. Description of the Prior Art

In an off-road vehicle capable of travelling off-road, the behavior of the vehicle body changes and the drivability of the vehicle differs depending on whether occupants ride in the specific boarding space of the vehicle or not. Hence, in the case that occupants ride in the specific boarding space, examples of off-road vehicles in which output control is performed are disclosed in U.S. Pat. Nos. 8,464,824 and 8,548,710.

SUMMARY OF THE INVENTION

The above-mentioned documents have disclosed off-road vehicles in which output control is performed depending on vehicle speed based on the vehicle speed sensor in the case that occupants ride in the specific boarding space, However, an object of the present invention is to provide an off-road vehicle in which more accurate output control is performed so that its drivability can be improved.

For the purpose of attaining the above-mentioned object, an off-road vehicle according to a first aspect of the present application is equipped with a driver's seat; a seat belt apparatus provided for the driver's seat; a seat belt detecting means for detecting the set state of the seat belt apparatus provided for the driver's seat; and a controller for controlling the off-road vehicle, wherein the controller has a rotation speed control mode for controlling the rotation speed of the engine to a predetermined rotation speed or less, and the controller releases the rotation speed control mode when the seat belt detecting means detects the set state of the seat belt apparatus provided for the driver's seat.

With the above-mentioned configuration, when the seat belt apparatus provided for the driver's seat has been set, that is, when the sitting of the driver on the driver's seat is detected, the rotation speed control mode in which the engine rotation speed is controlled to a predetermined rotation speed or less is released, whereby the drivability of the off-road vehicle can be improved. Since the engine rotation speed is controlled to the predetermined rotation speed or less instead of controlling the vehicle speed to a predetermined speed or less, the control is performed on the basis of the engine rotation speed having numerous pickup signals, whereby the behavior of the vehicle can be made smoother when the control is performed.

The first aspect is preferably equipped with the following configurations.

(1) The off-road vehicle is further equipped with passenger seats positioned on the side of the driver's seat and seat belt apparatuses provided for the passenger seats, wherein the seat belt detecting means detects the set states of the seat belt apparatuses provided for the passenger seats, and when the seat belt detecting means detects the set states of the seat belt apparatus provided for the driver's seat and the seat belt apparatuses provided for the passenger seats, the controller releases the rotation speed control mode, (2) In the configuration (1), the off-road vehicle is further equipped with rear passenger seats positioned behind the driver's seat and seat belt apparatuses provided for the rear passenger seats, wherein the seat belt detecting means detects the set states of the seat belt apparatuses provided for the rear passenger seats, and when the seat belt detecting means detects the sec states of the seat belt apparatus provided for the driver's seat, the seat belt apparatuses provided for the passenger sears and the seat belt apparatuses provided for the rear passenger seats, the controller releases the rotation speed control mode.

(3) The off-road vehicle is further equipped with a transmission sensor for detecting the state of the transmission, wherein when the transmission sensor recognizes the gear engagement of the transmission, the controller shifts to the rotation speed control mode.

(4) In the case that the seat belt detecting means cannot detect whether the seat belt apparatus provided for the driver's seat has been set, the controller maintains the rotation speed control mode.

(5) The off-road vehicle further equipped with a driver's seat detecting means for detecting the sitting of the driver on the driver's seat, wherein in the case that the driver's seat detecting means has detected the sitting of the driver, when the seat belt detecting means detects the set state of the seat belt apparatus provided for the driver's seat, the controller releases the rotation speed control mode.

(6) In the configuration (1), the off-road vehicle is further equipped with a driver's seat detecting means for detecting the sitting of the driver on the driver's seat and passenger seat detecting means for detecting the sitting of passengers on the passenger seats, wherein in the case that the driver's seat detecting means has detected the sitting of the driver and the passenger seat detecting means have detected the sitting of the passengers, when the seat belt detecting means detects the set states of the seat belt apparatus provided for the driver's seat and the seat belt apparatuses provided for the passenger seats, the controller releases the rotation speed control mode, (7) In the configuration (2), the off-road vehicle is further equipped with a driver's seat detecting means for detecting the sitting of the driver on the driver's seat, passenger seat detecting means for detecting the sitting of passengers on the passenger seats and rear passenger seat detecting means for detecting the sitting of rear passengers on the rear passenger seats, wherein in the case that the driver's seat detecting means has detected the sitting of the driver, the passenger seat detecting means have detected the sitting of the passengers and the rear passenger seat detecting means have detected the sitting of the rear passengers, when the seat belt detecting means detects the set states of the seat belt apparatus provided for the driver's seat, the seat belt apparatuses provided for the passenger seats and the seat belt apparatuses provided for the rear passenger seats, the controller releases the rotation speed control mode.

(8) While the off-road vehicle is travelling at an engine rotation speed exceeding the predetermined rotation speed, if the seat belt detecting means detects that the set state of the seat belt apparatus provided for the driver's seat has been released, the controller gradually decreases the engine rotation speed, and when the engine rotation speed is decreased to the predetermined rotation speed or less, the mode is shifted to the rotation speed control mode.

(9) In the case that the predetermined rotation speed, is a first rotation speed and while the off-road vehicle is travelling at an engine rotation speed equal to or less than the first rotation speed, if the seat belt detecting means detects that the set state of the seat belt apparatus provided for the driver's seat has been released, the controller gradually decreases the engine rotation speed to a second rotation speed, that is, a predetermined rotation speed lower than the first rotation speed, and when the engine rotation speed is decreased to the second rotation speed or less, the controller shifts to the rotation speed control mode.

With the configuration (1), when the seat belt apparatus provided for the driver's seat and the seat belt apparatuses provided for the passenger seats have been set, that is, when the sitting of the occupants on the driver's seat and the passenger seats is detected, the rotation speed control mode in which the engine rotation speed is controlled to the predetermined rotation speed or less is released, whereby the drivability of the off-road vehicle can be improved.

With the configuration (2), when the seat belt apparatus provided for the driver's seat, the seat belt apparatuses provided for the passenger seats and the seat belt apparatuses provided for the rear passenger seats have been set, that is, when the sitting of the occupants on the driver's seat, the passenger seats and the rear passenger seats is detected, the rotation speed control mode in which the engine rotation speed is controlled to the predetermined rotation speed or less is released, whereby the drivability of the off-road vehicle can be improved.

With the configuration (3), when the transmission sensor recognizes the gear engagement of the transmission, the controller shifts to the rotation speed control mode; hence, in the case that the drive force of the engine is not transmitted to the wheels via the transmission but used for other purposes, the drive force can be transmitted for the other purposes without shifting the mode to the rotation speed control mode. As a result, the transmission efficiency of the drive force can be improved.

With the configuration (4), in the case that the seat belt detecting means cannot detect whether the seat belt apparatus provided for the driver's seat has been set, the controller maintains the rotation speed control mode, whereby the rotation speed control mode is prevented from being released in the state in which the set state of the seat belt apparatus cannot be recognized.

With the configuration (5), in the case that the driver's seat detecting means has detected the sitting of the driver, when the seat belt detecting means detects the set state of the seat belt apparatus provided for the driver's seat, the controller releases the rotation speed control mode, whereby the sitting of the driver can be recognized twice using the driver's seat detecting means and the seat belt apparatus provided for the driver's seat.

With the configuration (6), in the case that the driver's seat detecting means has detected the sitting of the driver and the passenger seat detecting means have detected the sitting of the passengers, when the seat belt detecting means detects the set states of the seat belt apparatus provided for the driver's seat and the seat belt apparatuses provided for the passengers, the controller releases the rotation speed control mode. Hence, the sitting of the driver can be recognized twice using the driver's seat detecting means and the seat belt apparatus provided for the driver's seat, and the sitting of the passengers can be recognized twice using the passenger seat detecting means and the seat belt apparatuses provided for the passenger seats.

With the configuration (7), in the case that the driver's seat detecting means has detected the sitting of the driver, the passenger seat detecting means have detected the sitting of the passengers and the rear passenger seat detecting means have detected the sitting of the rear passengers, when the seat belt detecting means detects the set states of the seat belt apparatus provided for the driver's seat, the seat belt apparatuses provided for the passenger seats and the seat belt apparatuses provided for the rear passenger seats, the controller releases the rotation speed control mode. Hence, the sitting of the driver can be recognized twice using the driver's seat detecting means and the seat belt apparatus provided for the driver's seat, the sitting of the passengers can be recognized twice using the passenger seat detecting means and the seat belt apparatuses provided for the passengers, and the sitting of the rear passengers can be recognized twice using the rear passenger seat detecting means and the seat belt apparatuses provided for the rear passengers With the configuration (8), even in the case that the set state of the seat belt apparatus provided for the driver's seat is released while the off-road vehicle is travelling at an engine rotation speed exceeding the predetermined rotation speed, the mode is not shifted to the rotation speed control mode immediately, but the engine rotation speed is decreased gradually, whereby the driving state of the off-road vehicle can be prevented from being changed abruptly.

With the configuration (9), even in the case that the set state of the seat belt apparatus provided for the driver's seat is released while the off-road vehicle is travelling at an engine rotation speed equal to or less than the first rotation speed, the mode is not shifted to the rotation speed control mode immediately, but the engine rotation speed is decreased gradually, whereby the driving state of the off-road vehicle can be prevented from being changed abruptly.

An off-road vehicle according to a second aspect of the present application is equipped with a driver's seat; a seat belt apparatus provided for the driver's seat; a seat belt detecting means for detecting the set state of the seat belt apparatus provided for the driver's seat; a controller for controlling the off-road vehicle; and a GPS receiver, wherein the controller calculates the speed of the off-road vehicle on the basis of the position information obtained from the GPS receiver, the controller is equipped with a speed control mode in which the calculated vehicle speed is controlled to a predetermined speed or less, and when the seat belt detecting means detects the set state of the seat belt apparatus provided for the driver's seat, the controller releases the speed control mode.

With the above-mentioned configuration, when the seat belt apparatus provided for the driver's seat has been set, that is, when the sitting of the driver on the driver's seat is detected, the speed control mode in which the vehicle speed is controlled to the predetermined speed or less is released, whereby the drivability of the off-road vehicle can be improved. Furthermore, an accurate vehicle speed can be obtained by calculating the vehicle speed on the basis of the position information obtained from the GPS receiver.

The second aspect is preferably equipped with the following configurations.

(1) The off-road vehicle is further equipped with passenger seats positioned on the side of the driver's seat and seat belt apparatuses provided for the passenger seats, wherein the seat belt detecting means detects the set states of the seat belt apparatuses provided for the passenger seats, when the seat belt detecting means detects the set states of the seat belt apparatus provided for the driver's seat and the seat belt apparatuses provided for the passenger seats, the controller releases the speed control mode.

(2) In the configuration (1), the off-road vehicle is further equipped with rear passenger seats positioned behind the driver's seat and seat belt apparatuses provided for the rear passenger seats, wherein the seat belt detecting means detects the set states of the seat belt apparatuses provided for the rear passenger seats, and when the seat belt detecting means detects the set states of the seat belt apparatus provided for the driver's seat, the seat belt apparatuses provided for the passenger seats and the seat belt apparatuses provided for the rear passenger seats, the controller releases the speed control mode.

With the configuration (1), when the seat belt apparatus provided for the driver's seat and the seat belt apparatuses provided for the passenger seats have been set, that is, when the sitting of the occupants on the driver's seat and the passenger seats is detected, the speed control mode in which the vehicle speed is controlled to the predetermined speed or less is released, whereby the drivability of the off-road vehicle can be improved.

With the configuration (2), when the seat belt apparatus provided for the driver's seat, the seat belt apparatuses provided for the passenger seats and the seat belt apparatuses provided for the rear passenger seats have been set, that is, when the sitting of the occupants on the driver's seat, the passenger seats and the rear passenger seats is detected, the speed control mode in which the vehicle speed is controlled to the predetermined speed or less is released, whereby the drivability of the off-road vehicle can be improved.

DETAILED DESCRIPTION OF THE PREFERRED EMBODIMENTS (First Embodiment)
[Overall Configuration]

Figure 1:
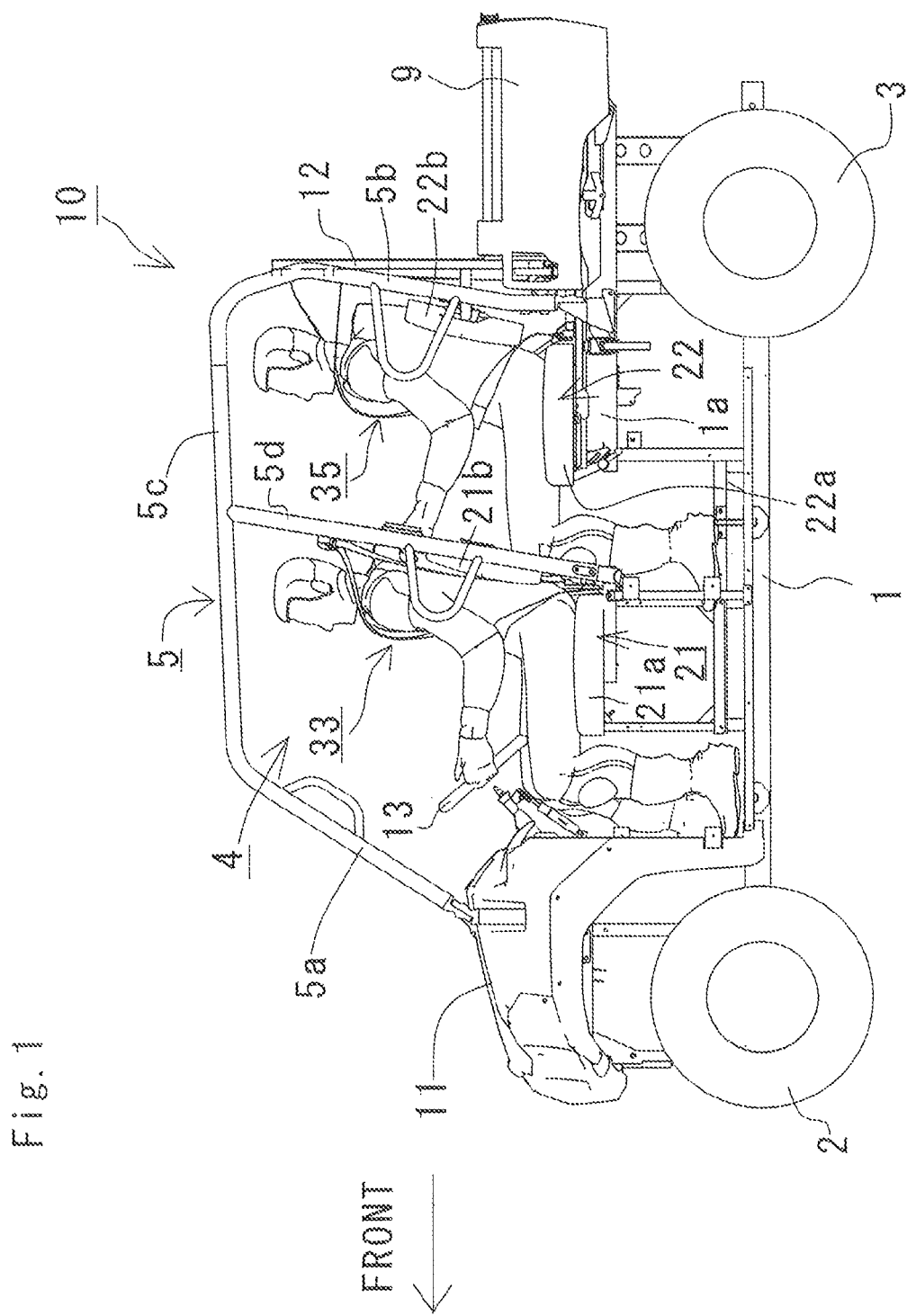
FIG. 1 is a left side view showing an off-road vehicle according to a first embodiment of the present invention.

FIG. 1 is a left side view showing an off-road vehicle 10 according to a first embodiment of the present invention. As shown in FIG. 1, the off-road vehicle 10 is equipped with a pair of left and right front wheels 2 on the front portion of a vehicle body 1, a pair of left and right rear wheels 3 on the rear portion of the vehicle body 1, and a boarding space (cabin) 4 between the front wheels 2 and the rear wheels 3. The boarding space 4 is enclosed with a ROPS 5. A loading platform 9 is provided behind the boarding space 4, and a bonnet 11 is provided in front of the boarding space 4. A screen 12 for partitioning the loading platform 9 and the boarding space 4 is provided at the front end portion of the loading platform 9. In addition, operation portions (dashboard), such as a steering wheel 13, are provided at the front end portion of the boarding space 4.

The ROPS is an abbreviation of rollover protective structure and is equipped with a front side portion 5a extending rear upward from the vicinity of both the left and right side portions of the bonnet 11; a rear side portion 5b extending nearly upward from both the left and right side portions of the rear end portion of the boarding space 4; an upper side portion 5c integrally connecting the upper end portion of the front side portion 5a and the upper end portion of the rear side portion 5b and extending in the front-rear direction; and an intermediate vertical portion 5d extending downward from the intermediate portion of the upper side portion 5c in the front-rear direction.

[Seats and Seat Belt Apparatuses]

Figure 2:
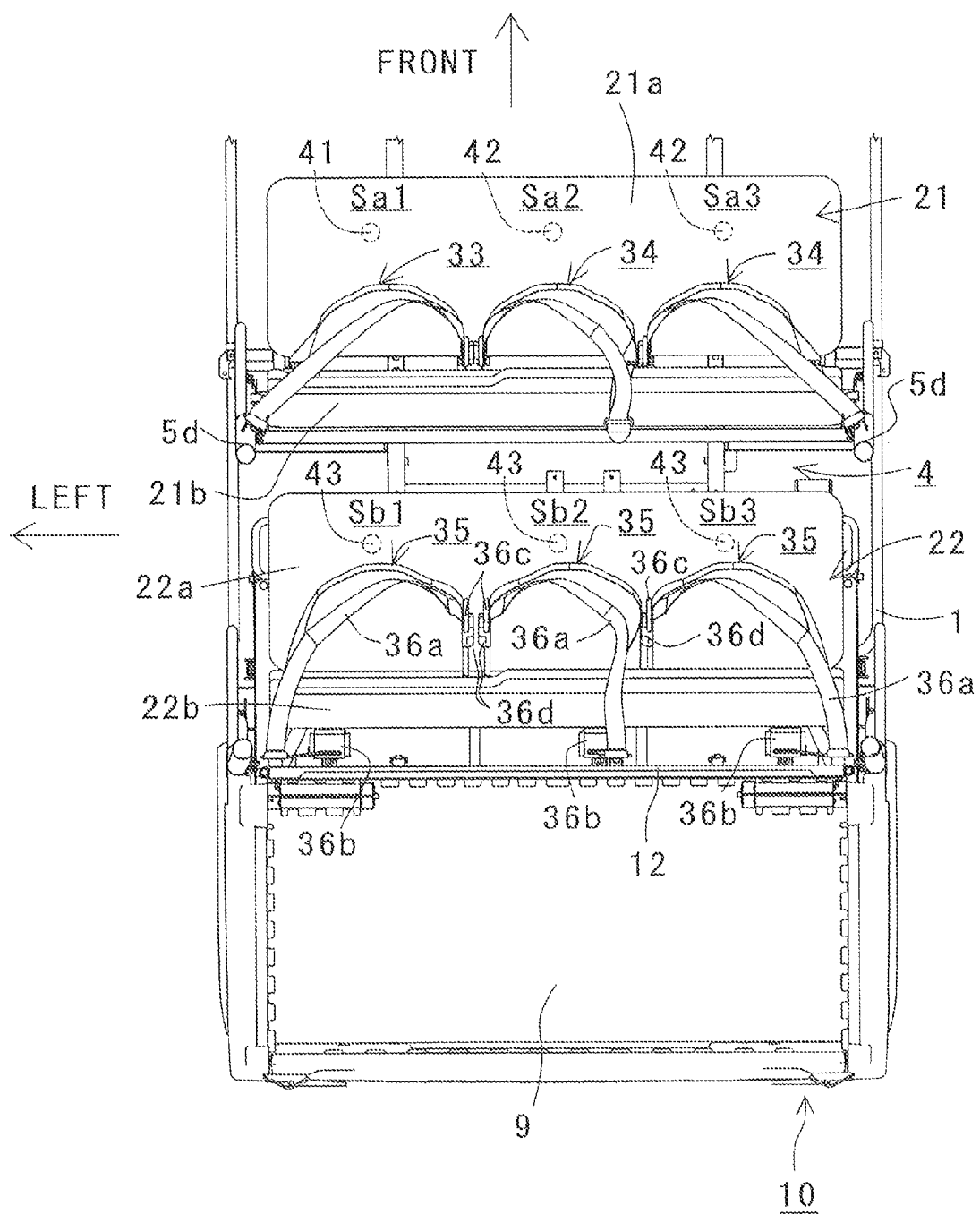
FIG. 2 is a top view showing part of the off-road vehicle.

FIG. 2 is a top view showing part of the off-road vehicle 10. As shown in FIG. 2, the off-road vehicle 10 is equipped with a bench-type front seat 21 on the front half portion of the boarding space 4 and a bench-type rear seat 22 on the rear half portion of the boarding space 4. The front seat 21 is equipped with a seat portion 21a having a rectangular shape being long in the vehicle width direction and a backrest 21b having a rectangular shape being long in the vehicle width direction. The rear seat 22 is equipped with a seat portion 22a having a rectangular shape being long in the vehicle width direction and a backrest 22b having a rectangular shape being long in the vehicle width direction.

In this embodiment, the bench-type front seat 21 is a seat for three occupants. Accordingly, three-point seat belt apparatuses 33, 34 and 34 are provided for the three seating regions Sa1, Sa2 and Sa3 of the front seat 21. The left seating region Sa1 of the front seat 21 is a driver's seat, and the seating regions Sa2 and Sa3 are passenger seats. Hence, the seat belt apparatus 33 is the seat belt apparatus provided for the driver's seat, and the seat belt apparatuses 34 are the seat belt apparatuses provided for the passengers.

Similarly, the bench-type rear seat 22 is a seat for three occupants. Accordingly, three-point seat belt apparatuses 35 are provided for the three seating regions Sb1, Sb2 and Sb3 of the rear seat 22. The seating regions Sb1, Sb2 and Sb3 are rear passenger seats, whereby the seat belt apparatuses 35 are the seat belt apparatuses provided for rear passengers.

The seat belt apparatuses 33, 34 and 35 basically have similar structures. Hence, the seat belt apparatus 35 is herein taken as an example, and its structure will be described below. The seat belt apparatus 35 is equipped with a webbing 36a that is the integration of a lap belt and a shoulder belt; a retractor 36b for windably supporting one end of the webbing 36a; a lower anchor (not shown) for supporting the other end of the webbing 36a; a tongue plate 36c attached to the middle of the webbing 36a; a buckle 36d detachably connected to the tongue plate 36c; and an upper anchor (not shown) slidably supporting the middle of the shoulder belt. After sitting in a seating region, an occupant extracts the webbing 36a from the retractor 36b, adjusts the length of the lap belt and the length of the shoulder belt, and attaches the tongue plate 36c to the buckle 36d. As a result, the extra length of the webbing 36a is wound by the retractor 36b, and the occupant is held in the seating region by the seat belt apparatus 35. The respective components of the seat belt apparatuses 33 and 34 corresponding to the respective components of the seat belt apparatus 35 will be described using reference numerals similar to those of the seat belt apparatus 35.

As shown in FIG. 2, in the lower portion of the front seat 21, seat switches 41 and 42 are provided so as to correspond to the seating regions Sa1, Sa2 and Sa3. When occupants sit in the seating regions Sa1, Sa2 and Sa3, the seat switches 41 and 42 are pressed by the weights of the occupants, thereby detect the sitting in the seating regions Sa1, Sa2 and Sa3. Similarly, in the lower portion of the rear seat 22, seat switches 43 are provided so as to correspond to the seating regions Sb1, Sb2 and Sb3. The seat switch 43 has a structure similar to those of the seat switches 41 and 42. When occupants sit in the seating regions Sb1, Sb2 and Sb3, the seat switches 43 are pressed by the weights of the occupants, thereby detecting the sitting in the seating regions Sb1, Sb2 and Sb3.

[Connection Configuration of ECU]

Figure 3:
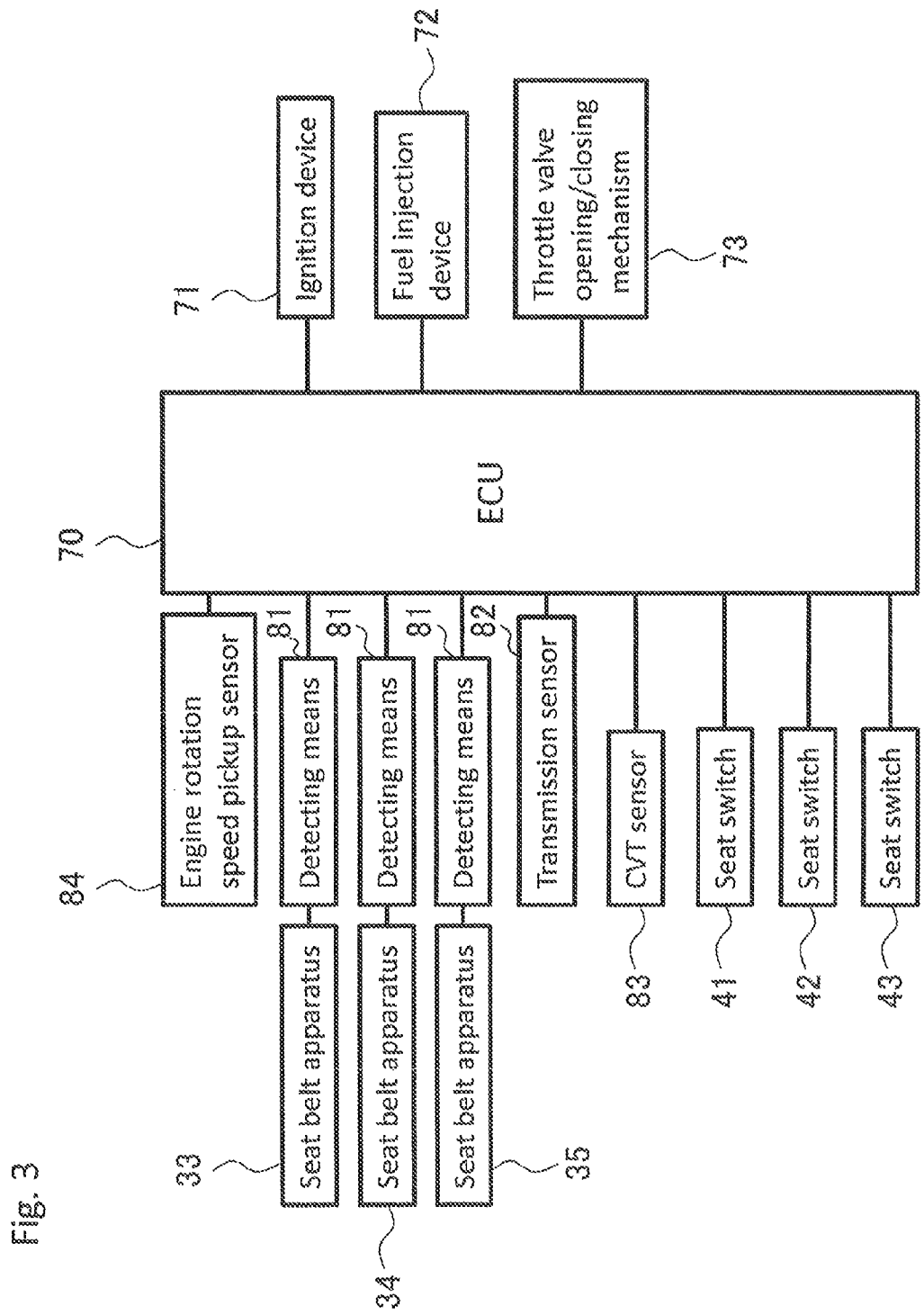
FIG. 3 is a view showing the connection configuration of an ECU.

The off-road vehicle 10 has a controller (electronic control unit (ECU)) 70 for controlling the off-road vehicle 10. FIG. 3 is a view showing the connection configuration of the ECU 70. As shown in FIG. 3, the ECU 70 is electrically connected to an ignition device 71, a fuel injection device 72 and a throttle valve opening/closing mechanism 73 and controls the rotation speed of the engine by adjusting ignition timing, fuel injection amount and throttle valve opening/closing. Furthermore, the ECU 70 is equipped with a rotation speed control mode in which the rotation speed of the engine is controlled to a predetermined rotation speed (first rotation speed) or less by controlling the ignition device 71, the fuel injection device 72 and the throttle valve opening/closing mechanism 73. Moreover, the ECU 70 is electrically connected to an engine rotation speed pickup sensor 84 for detecting the engine rotation speed.

The off-road vehicle 10 is equipped with seat belt detecting means 81 for detecting the set states of the seat belt apparatuses 33, 34 and 35; more specifically, the seat belt detecting means 81 detect whether the tongue plates 36f of the seat belt apparatuses 33, 34 and 35 are attached to the buckles 36g respectively corresponding thereto. In this embodiment, the off-road vehicle 10 is equipped with seat belt detecting means respectively corresponding to the seat belt apparatuses 33, 34 and 35 as the seat belt detecting means 81. In addition, the seat belt apparatuses 33, 34 and 35 are electrically connected to the seat belt detecting means respectively corresponding thereto, and the respective seat belt detecting means are electrically connected to the ECU 70.

The off-road vehicle 10 is equipped with a gear type transmission and a V-belt type continuously variable transmission (CVT), the drive force of the engine is transmitted to the transmission via the V-belt type continuously variable transmission, and the drive force drawn out from the transmission is transmitted to the wheels 2 and 3. The shift stage of the transmission can be changed among high, low and neutral positions. On the other hand, in the V-belt type continuously variable transmission, shifting is performed automatically depending on the increase/decrease in the engine rotation speed and the loads on the wheels 2 and 3. Furthermore, the off-road vehicle 10 is equipped with a transmission sensor 82 for detecting the state of the transmission, such as the shift stage of the transmission, and a CVT sensor 83 for detecting the belt position of the V-belt type continuously variable transmission. More specifically, the transmission sensor 82 detects whether the transmission is gear-engaged and detects the above-mentioned gear position.

The ECU 70 is electrically connected to the seat belt detecting means 81, the transmission sensor 82, the CVT sensor 83 and the seat switches 41 to 43, receives the detection results of the seat belt detecting means 81, the transmission sensor 82, the CVT sensor 83 and the seat switches 41 to 43, and controls the ignition device 71, the fuel injection device 72 and the throttle valve opening/closing mechanism 73. The seat, switches 41 to 43 are respectively electrically connected to the ECU 70. The specific control contents of the ECU 70 will be described below.

[Examples of Control by ECU]

In the state in which the engine has been started, the ECU 70 is not in the rotation speed control mode in which the engine rotation speed is controlled to the first rotation speed or less. This is because load work, such as winching, can be carried out in the state in which the engine has been started and the vehicle has been placed at a designated position. In the case that the off-road vehicle 10 travels, when the transmission sensor 82 recognizes the gear engagement of the transmission, the ECU 70 shifts to the rotation speed control mode. The first rotation speed is herein detected by the engine rotation speed pickup sensor 84 or calculated on the basis of the detection result of the gear position of the transmission detected by the transmission sensor 82, the detection result of the belt position detected by the CVT sensor 83, etc.; for example, in the case that the rated rotation speed of the engine is 6000 rpm, the first rotation speed is set to not more than half of the rotation speed, that is, approximately 2000 to 3000 rpm.

Furthermore, when the seat belt detecting means 31 detects the set state of the seat belt apparatus 33, the ECU 70 releases the rotation speed control mode. In other words, when the seat belt detecting means 81 detects the set state of the seat belt provided for the driver's seat, the ECU 70 judges that the sitting of the driver on the driver's seat has been completed and allows the engine rotation speed to increase to a rotation speed exceeding the first rotation speed.

In the above-mentioned description, to detect the sitting of the driver on the driver's seat, the detection by the seat switch 41 may be used in combination. More specifically, in the case that the seat switch 41 has detected the sitting of the driver, when the seat belt detecting means 81 detects the set state of the seat belt apparatus 33, the ECU 70 releases the rotation speed control mode.

Furthermore, in the case that the seat belt detecting means 81 cannot detect whether the seat belt apparatus 33 is set, the ECU 70 maintains the rotation speed control mode.

While the off-road vehicle 10 is travelling at an engine rotation speed exceeding the first rotation speed, if the seat belt detecting means 81 detects that the set state of the seat belt apparatus 33 has been released, the ECU 70 gradually decreases the engine rotation speed, and when the engine rotation speed is decreased to the first rotation speed or less, the mode is shifted to the rotation speed control mode.

Furthermore, while the off-road vehicle 10 is travelling at an engine rotation speed equal to or less than the first rotation speed, if the seat belt detecting means 81 detects that the set state of the seat belt apparatus 33 has been released, the ECU 70 gradually decreases the engine rotation speed to a second rotation speed, that is, a predetermined rotation speed lower than the first rotation speed, and when the engine rotation speed is decreased to the second rotation speed or less, the ECU 70 shifts to the rotation speed control mode. Like the first rotation speed, the second rotation speed is detected by the engine rotation speed pickup sensor 84 or calculated on the basis of the detection result of the gear position of the transmission detected by the transmission sensor 82, the detection result of the belt position detected by the CVT sensor 83, etc.

With the above-mentioned embodiment, the following advantages can be produced.

(1) When the seat belt apparatus 33 has been set, that is, when the sitting of the driver on the driver's seat is detected, the rotation speed control mode in which the engine rotation speed is controlled to the first rotation speed or less is released, whereby the drivability of the off-road vehicle can be improved. Since the engine rotation speed is controlled to the predetermined rotation speed or less instead of controlling the vehicle speed to a predetermined speed or less, the control is performed on the basis of the engine rotation speed having numerous pickup signals, whereby the behavior of the vehicle can be made smoother when the control is performed.

(2) When the transmission sensor 82 recognizes the gear engagement of the transmission, the ECU 70 shifts to the rotation speed control mode; hence, in the case that the drive force of the engine is not transmitted to the wheels via the transmission but used for other purposes, the drive force can be transmitted for the other purposes without shifting the mode to the rotation speed control mode. As a result, the transmission efficiency of the drive force can be improved. For example, in the case that a winch or the like provided in the off-road vehicle is driven using the drive force of the engine, the winch or the like can be driven without shifting the mode to the rotation speed control mode. As a result, the work efficiency of the winch or the like can be improved.

(3) In the case that the seat belt detecting means 81 cannot detect whether the seat belt apparatus 33 has been set, the ECU 70 maintains the rotation speed control mode, whereby the rotation speed control mode is prevented from being released in the state in which the set state of the seat belt apparatus 33 cannot be recognized.

(4) Even in the case that the set state of the seat belt apparatus 33 has been released while the off-road vehicle 10 is travelling at an engine rotation speed exceeding the first rotation speed, the mode is not shifted to the rotation speed control mode immediately, but the engine rotation speed is decreased gradually, whereby the driving state of the off-road vehicle 10 can be prevented from being changed abruptly.

(5) Even in the case that the set state of the seat belt apparatus 33 is released while the off-road vehicle 10 is travelling at an engine rotation speed equal to the first rotation speed or less, the mode is not shifted to the rotation speed control mode immediately, but the engine rotation speed is decreased gradually to the second rotation speed lower than the first rotation speed, whereby the driving state of the off-road vehicle 10 can be prevented from being changed abruptly.

(6) In the case that she seat switch 41 has detected the sitting of the driver, when the seat belt detecting means 81 detects the set state of the seat belt apparatus 33, the ECU 70 releases the rotation speed control mode, whereby the sitting of the driver can be recognized twice using the seat switch 41 and the seat belt apparatus 33.

[Modification 1]

The release of the rotation speed control mode may be controlled depending on not only the set state of the seat belt apparatus 33 but also the set states of the seat detecting means 34. More specifically, when the seat belt detecting means 81 detect the set states of the seat belt apparatus 33 and the seat belt apparatuses 34, the ECU 70 releases the rotation speed control mode. In other words, when the seat belt detecting means 81 detect the set states of the seat belt apparatus provided for the driver's seat and the seat belt apparatuses provided for the passenger seats, the ECU 70 judges that the sitting of the occupants on the driver's seat and the passenger seats has been completed and allows the engine rotation speed to increase to a rotation speed exceeding the first rotation speed.

In Modification 1 described above, to detect the sitting of the occupants on the driver's seat and the passenger seats, the detection by the seat switches 41 and 42 may be used in combination. More specifically, in the case that the seat switches 41 and 42 nave detected the sitting of the occupants, when the seat belt detecting means 81 detect the set states of the seat belt apparatuses 33 and 34, the ECU 70 releases the rotation speed control mode.

With Modification 1 described above, the following advantages can be produced.

(1) When the seat belt apparatuses 33 and 34 have been set, that is, when the sitting of the occupants on the driver's seat and the passenger seats is detected, the rotation speed control mode in which the engine rotation speed is controlled to the first rotation speed or less is released, whereby the drivability of the off-road vehicle can be improved.

(2) In the case that the seat switch 41 has detected the sitting of the driver and the seat switches 42 have detected the sitting of the passengers, when the seat belt detecting means 81 detect the set states of the seat belt apparatuses 33 and 34, the ECU 70 releases the rotation speed control mode. Hence, the sitting of the driver can be recognized twice using the seat switch 41 and the seat belt apparatus 33, and the sitting of the passengers can be recognized twice using the seat switches 42 and the seat belt apparatuses 34.

[Modification 2]

The release of the rotation speed control mode may be controlled depending on not only the set state of the seat belt apparatus 33 but also the set states of the seat belt apparatus 34 and 35. More specifically, when the seat belt detecting means 81 detect the set states of the seat belt apparatuses 33, 34 and 35, the ECU 70 releases the rotation speed control mode. In other words, when the seat belt detecting means 81 detect the set states of the seat belt apparatus provided for the driver's seat, the seat belt apparatuses provided for the passenger seats and the seat belt apparatuses provided for the rear passenger seats, the ECU 70 judges that the sitting of the occupants on the driver's seat, the passenger seats and the rear passenger seats has been completed and allows the engine rotation speed to increase to a rotation speed exceeding the first rotation speed.

In Modification 2 described above, to detect the sitting of the occupants on the driver's seat, the passenger seats and the rear passenger seats, the detection by the seat switches 41 to 43 may be used in combination. More specifically, in the case that the seat switches 41 to 43 have detected the sitting of the occupants, when the seat belt detecting means 81 detect the set states of the seat belt apparatuses 33, 34 and 35, the ECU 70 releases the rotation speed control mode.

With Modification 2 described above, she following advantages can be produced.

(1) When the seat belt apparatuses 33, 34 and 35 have been set, that is, when the sitting of the occupants on the driver's seat, the passenger seats and the rear passenger seats is detected, the rotation speed control mode in which the engine rotation speed is controlled to the first rotation speed or less is released, whereby the drivability of the off-road vehicle can be improved.

(2) In the case that the seat switch 41 has detected the sitting of the driver, the seat switches 42 have detected the sitting of the passengers and the seat switches 43 have detected the sitting of the rear passengers, when the seat belt detecting means 81 detect the set states of the seat belt apparatuses 33, 34 and 35, the ECU 70 releases the rotation speed control mode. Hence, the sitting of the driver can be recognized twice using the seat switch 41 and the seat belt apparatus 33, the sitting of the passengers can be recognized twice using the seat switches 42 and the seat belt apparatuses 34 and the sitting of the rear passengers can be recognized twice using the seat switches 43 and the seat belt apparatuses 35.

(Second Embodiment)

The overall configuration of an off-road vehicle 10 according to a second embodiment of the present invention is basically similar to that according to the first embodiment. The second embodiment is different from the first embodiment in that, although the ECU 70 according to the first embodiment performs the shifting and release to and from the rotation speed control mode under predetermined conditions, an ECU 90 according to the second embodiment performs the shifting and release to and from a speed control mode under predetermined conditions. Hence, in the second embodiment, the descriptions of portions similar to those according to the first embodiment are omitted, and only the above-mentioned differences will be described below.

Figure 4:
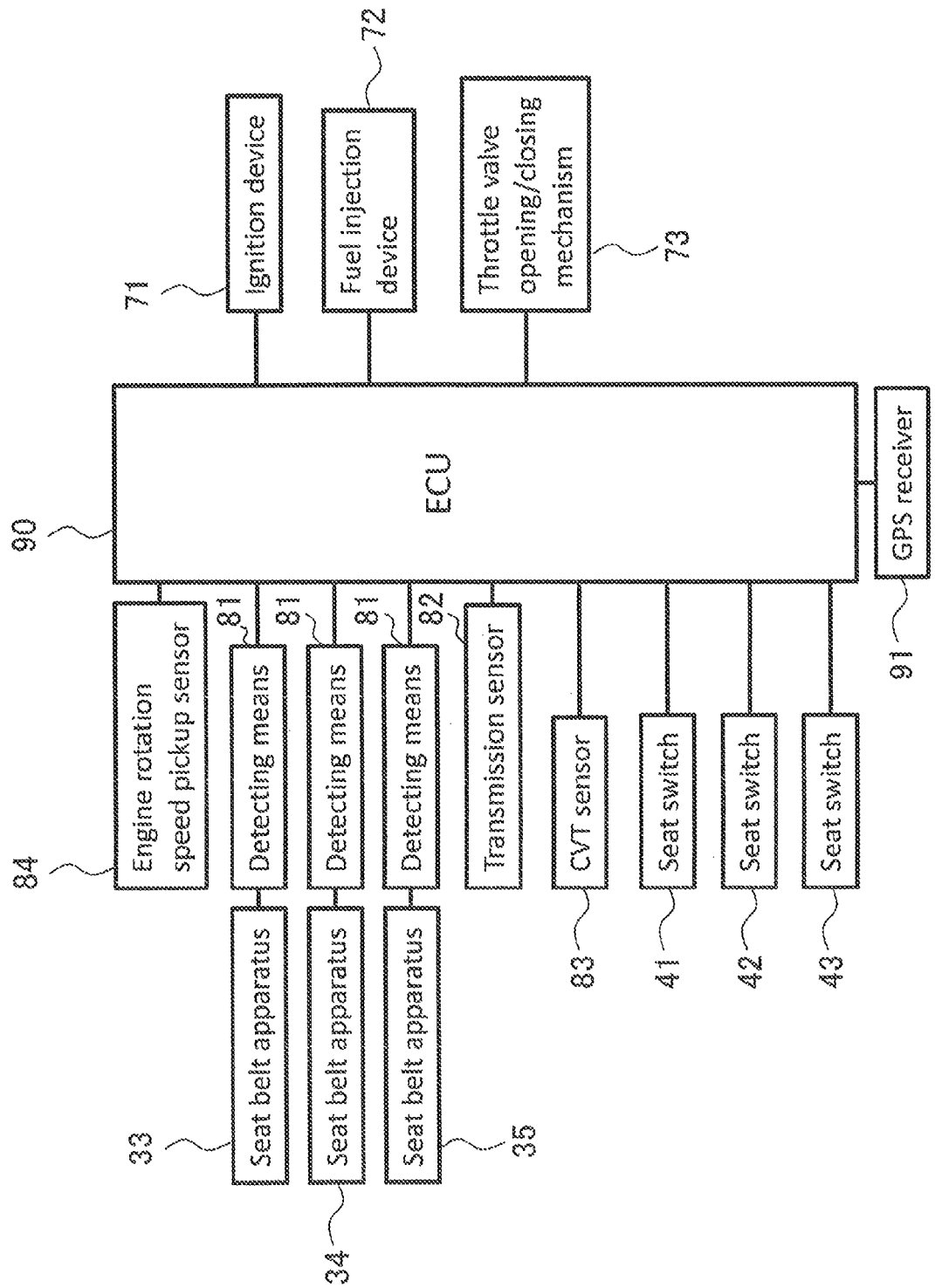
FIG. 4 is a view showing the connection configuration of an ECU for use in an off-road vehicle according to a second embodiment of the present invention.

The off-road vehicle 10 has a controller (electronic control unit (ECU)) 90 for controlling the off-road vehicle 10 and a GFS receiver 91. FIG. 4 is a view showing the connection configuration of the ECU 90. As shown in FIG. 4, the ECU 90 is electrically connected to the GPS receiver 91 and detects the speed of the off-road vehicle 10 on the basis of the position information of the off-road vehicle 10 obtained from the GPS receiver 91. Furthermore, the ECU 90 is electrically connected to the ignition device 71, the fuel injection device 72 and the throttle valve opening/closing mechanism 73 and controls the vehicle speed by adjusting ignition timing, fuel injection amount and throttle valve opening/closing. Furthermore, the ECU 90 is equipped with a speed control mode in which the vehicle speed is controlled lo a predetermined speed (first speed) or less by controlling the ignition device 71, the fuel injection device 72 and the throttle valve opening/closing mechanism 73.

The ECU 90 performs the shifting and release to and from the speed control mode under the same conditions as the predetermined conditions under which the ECU 70 performs the shifting and release to and from the rotation speed control mode. This will be described below more specifically.

In the state in which the engine has been started, the ECU 90 is not in the speed control mode in which the vehicle speed is controlled to the first speed or less. In the case that the off-road vehicle 10 travels, when the transmission sensor 82 recognizes the gear engagement of the transmissions the ECU 90 shifts to the speed control mode.

When the seat belt detecting means 81 detects the set state of the seat belt apparatus 33, the ECU 90 releases the speed control mode. In other words, when the seat belt detecting means 81 detects the set state of the seat belt apparatus provided for the driver's seat, the ECU 90 judges that the sitting of the driver on the driver's seat has been completed and allows the vehicle speed to increase to a vehicle speed exceeding the first speed.

In the above-mentioned description, to detect the sitting of the driver on the driver's seat, the detection by the seat switch 41 may be used in combination. More specifically, in the case that the seat switch 41 has detected the sitting of the driver, when the seat belt detecting means 81 detects the set state of the seat belt apparatus 33, the ECU 90 releases the speed control mode.

Furthermore, in the case that the seat belt detecting means 81 cannot detect whether the seat belt apparatus 33 is set, the ECU 90 maintains the speed control mode.

While the off-road vehicle 10 is travelling at a vehicle speed exceeding the first speed, if the seat belt detecting means 81 detects that the set state of the seat belt apparatus 33 has been released, the ECU 90 gradually decreases the vehicle speed, and when the vehicle speed is decreased to the first speed or less, the ECU 90 shifts to the speed control mode.

Furthermore, while the off-road vehicle 10 is travelling at a vehicle speed equal to or less than the first speed, if the seat belt detecting means 81 detects that the set state of the seat belt apparatus 33 has been released, the ECU 90 gradually decreases the vehicle speed to a second speed, that is, a predetermined speed lower than the first speed. When the vehicle speed is decreased to the second speed or less, the ECU 90 shifts to the speed control mode.

With the above-mentioned embodiment, the following advantages can be produced.

When the seat belt apparatus 33 has been set, that is, when the sitting of the driver on the driver's seat is detected, the speed control mode in which the vehicle speed is controlled to the first speed or less is released, whereby the drivability of the off-road vehicle can be improved. Furthermore, an accurate vehicle speed can be obtained by calculating the vehicle speed on the basis of the position information obtained from the GPS receiver 91. Since GPS receiver 91 is used, the vehicle speed sensor on the vehicle can be omitted from the off-road vehicle 10.

The release of the speed control mode may be controlled depending on not only the set state of the seat belt apparatus 33 but also the set states of the seat belt apparatus 34 and 35. More specifically, when the seat belt detecting means 81 detect the set states of the seat belt apparatuses 33, 34 and 35, the ECU 90 releases the speed control mode. In other words, when the seat belt detecting means 81 detect the set states of the seat belt apparatus provided for the driver's seat, the seat belt apparatuses provided for the passenger seats and the seat belt apparatuses provided for the rear passenger seats, the ECU 90 judges that the sitting of the occupants on the driver's seat, the passenger seats and the rear passenger seats has been completed and allows the vehicle speed to increase to a speed exceeding the first speed.

In addition, to detect the sitting of the occupants on the driver's seat, the passenger seats and the rear passenger seats, the detection by the seat switches 41 to 43 may be used in combination. More specifically, in the case that the seat switches 41 to 43 have detected the sitting of the occupants, when the seat belt detecting means 81 detect the set states of the seat belt apparatuses 33, 34 and 35, the ECU 90 releases the speed control mode.

Although the front seat 21 and the rear seat 22 are formed into a bench type in the above-mentioned embodiments, the seats may be formed into a box type, and the off-road vehicle 10 may be equipped with only the front seat. Furthermore, in the case that the vehicle is equipped with only the front seat, the riding capacity of the off-road vehicle 10 may be one, two or three persons. Furthermore, in the case that the vehicle is equipped with the front seat and the rear seat, one, two or three persons may sit on the front seat, and two or three persons may sit on the rear seat.

Although the driver's seat detecting means, the passenger seat detecting means and the rear passenger detecting means for detecting the sitting of the occupants are the seat switches 41 to 43 provided under the seats 21 and 22 in the above-mentioned embodiments, the detecting means are not limited to the seat switches, but weight detection sensors and infrared sensors, for example, may also be used.

The present invention is not limited to the configurations according to the above-mentioned embodiments, but includes various modifications that can be made within a range not departing from the contents set forth in the claims.

The invention claimed is:

1. An off-road vehicle comprising a driver's seat; a seat belt apparatus provided for the driver's seat; a driver's seat belt detecting device for detecting the set state of the seat belt apparatus provided for the driver's seat; and a controller for controlling the off-road vehicle, wherein:
   the controller has a rotation speed control mode for controlling the rotation speed of the engine to a predetermined rotation speed or less;
   the controller releases the rotation speed control mode when the driver's seat belt detecting device detects the set state of the seat belt apparatus provided for the driver's seat; and
   while the off-road vehicle is travelling at an engine rotation speed exceeding the predetermined rotation speed, if the driver's seat belt detecting device detects that the set state of the seat belt apparatus provided for the driver's seat has been released, the controller gradually decreases the engine rotation speed, and when the engine rotation speed is decreased to the predetermined rotation speed or less, the mode is shifted to the rotation speed control mode.

2. The off-road vehicle according to claim 1, further comprising passenger seats positioned on the side of the driver's seat and seat belt apparatuses provided for the passenger seats, and passenger's seat belt detecting devices for detecting the set states of the seat belt apparatuses provided for the passenger seats, and wherein:
   when the driver's seat belt detecting device detects the set state of the seat belt apparatus provided for the driver's seat and the passenger's seat belt detecting devices detect the set states of the seat belt apparatuses provided for the passenger seats, the controller releases the rotation speed control mode.

3. The off-road vehicle according to claim 2, further comprising rear passenger seats positioned behind the driver's seat and seat belt apparatuses provided for the rear passenger seats, and rear passenger's seat belt detecting devices for detecting the set states of the seat belt apparatuses provided for the rear passenger seats, wherein:
   when the driver's seat belt detecting device detects the set state of the seat belt apparatus provided for the driver's seat, the passenger's seat belt detecting devices detect the set states of the seat belt apparatuses provided for the passenger seats and the rear passenger's seat belt detecting devices detect the set states of the seat belt apparatuses provided for the rear passenger seats, the controller releases the rotation speed control mode.

4. The off-road vehicle according to claim 3, further comprising a driver's seat detecting device for detecting the sitting of the driver on the driver's seat, passenger seat detecting devices for detecting the sitting of passengers on the passenger seats and rear passenger seat detecting devices for detecting the sitting of rear passengers on the rear passenger seats, wherein:
   in the case that the driver's seat detecting device has detected the sitting of the driver, the passenger seat detecting devices have detected the sitting of the passengers, and the rear passenger seat detecting devices have detected the sitting of the rear passengers, when the driver's seat belt detecting device detects the set state of the seat belt apparatus provided for the driver's seat, the passenger's seat belt detecting devices detect the set states of the seat belt apparatuses provided for the passenger seats and the rear passenger's seat belt detecting devices detect the set states of the seat belt apparatuses provided for the rear passenger seats, the controller releases the rotation speed control mode.

5. The off-road vehicle according to claim 2, further comprising a driver's seat detecting device for detecting the sitting of the driver on the driver's seat and passenger seat detecting devices for detecting the sitting of passengers on the passenger seats, wherein:
   in the case that the driver's seat detecting device has detected the sitting of the driver and the passenger seat detecting devices have detected the sitting of the passengers, when the driver's seat belt detecting device detects the set states of the seat belt apparatus provided for the driver's seat and the passenger's seat belt detecting devices detect the set states of the seat belt apparatuses provided for the passenger seats, the controller releases the rotation speed control mode.

6. The off-road vehicle according to claim 1, further comprising a transmission sensor for detecting the state of the transmission, wherein:
   when the transmission sensor recognizes the gear engagement of the transmission, the controller shifts to the rotation speed control mode.

7. The off-road vehicle according to claim 1, wherein, in the case that the driver's seat belt detecting device cannot detect whether the seat belt apparatus provided for the driver's seat has been set, the controller maintains the rotation speed control mode.

8. The off-road vehicle according to claim 1, further comprising a driver's seat detecting device for detecting the sitting of the driver on the driver's seat, wherein, in the case that the driver's seat detecting device has detected the sitting of the driver, when the driver's seat belt detecting device detects the set state of the seat belt apparatus provided for the driver's seat, the controller releases the rotation speed control mode.

9. An off-road vehicle comprising a driver's seat; a seat belt apparatus provided for the driver's seat; a driver's seat belt detecting device for detecting the set state of the seat belt apparatus provided for the driver's seat; and a controller for controlling the off-road vehicle, wherein:
   the controller has a rotation speed control mode for controlling the rotation speed of the engine to a predetermined rotation speed or less,
   the controller releases the rotation speed control mode when the driver's seat belt detecting device detects the set state of the seat belt apparatus provided for the driver's seat, and
   in the case that the predetermined rotation speed is a first rotation speed and while the off-road vehicle is travelling at an engine rotation speed equal to or less than the first rotation speed, if the driver's seat belt detecting device detects that the set state of the seat belt apparatus provided for the driver's seat has been released, the controller gradually decreases the engine rotation speed to a second rotation speed, that is, a predetermined rotation speed lower than the first rotation speed, and when the engine rotation speed is decreased to the second rotation speed or less, the controller shifts to the rotation speed control mode.

* * * * *